Patented Sept. 15, 1942

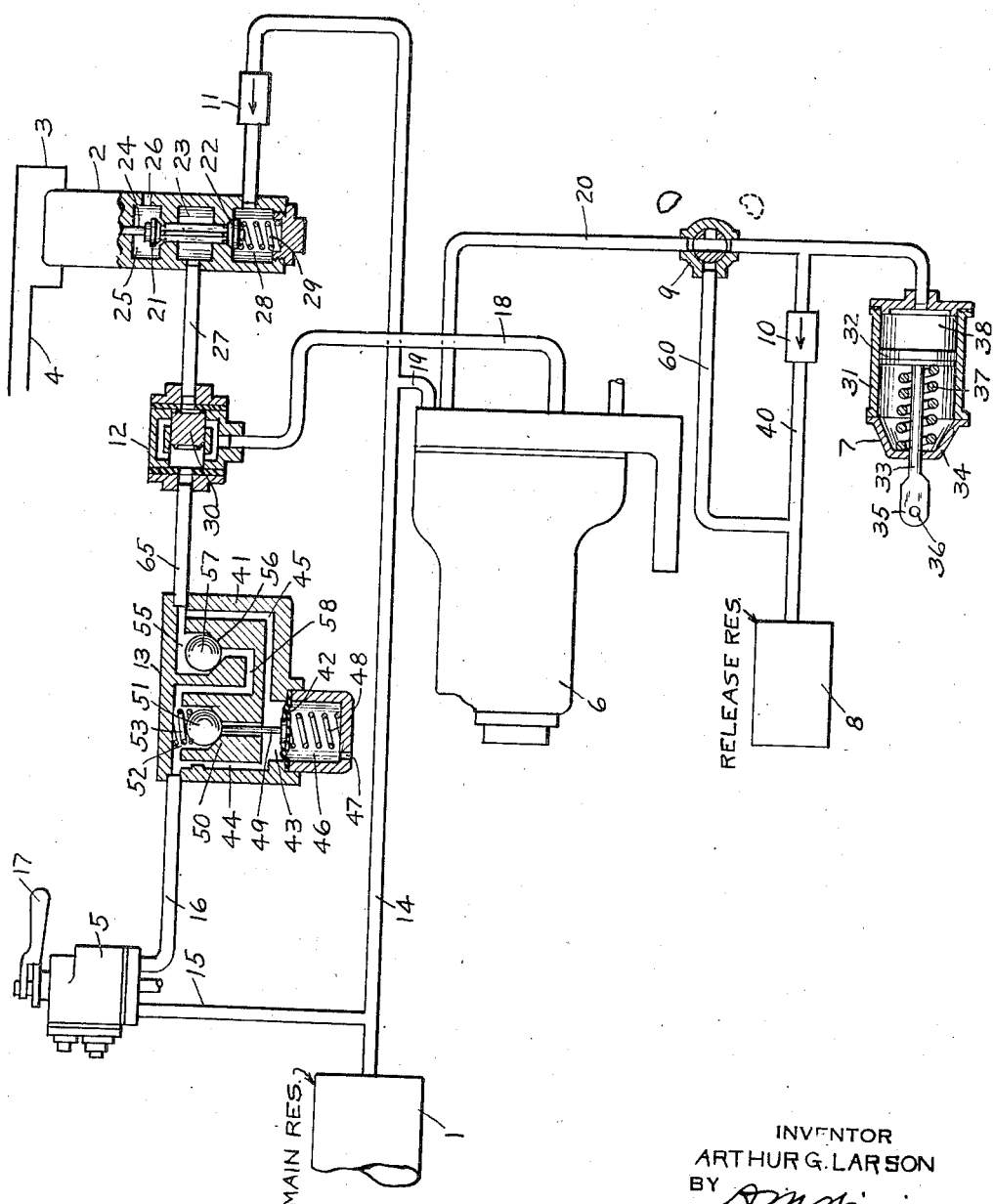

2,295,796

UNITED STATES PATENT OFFICE 2,295,796

BRAKE CONTROL MEANS

Arthur G. Larson, Forest Hills, Pa., assignor to The Westinghouse Air Brake Company, Wilmerding, Pa., a corporation of Pennsylvania Application March 30, 1940, Serial No. 326,999

15 Claims. (Cl. 303—3)

This invention relates to railway brake systems, and more particularly to brake systems of the type in which an electrodynamic brake system and a wheel brake device of the spring applied type are interlocked.

In brake systems of this type it is usually the practice to employ the dynamic brakes alone when making normal stops and the spring applied brakes are provided to insure stopping of the train or vehicle upon failure of the dynamic brake. In addition, since the effectiveness of the dynamic brakes diminishes at low speeds, it is desirable that the spring applied brake be cut into action at or about the time the dynamic brakes diminishes in effectiveness, so as to insure stopping and holding of the train or vehicle at rest.

While it is desirable that the spring applied brake be effective in the event of failure of the dynamic brake as well as when the effectiveness of the dynamic brake falls below a certain value, it is also desirable that means be provided for releasing the spring applied brake and for insuring that this brake will remain released during normal applications of the brakes, so long as the effectiveness of the dynamic brakes is above the certain value.

Brake systems of the type above referred to are usually provided with a control element which is so constructed and arranged that through its operation each of the two brake mechanisms is rendered effective for bringing the vehicle or train to a stop in the manner above described. Such brake systems are also provided with a lockout magnet device which is embodied in the system for the purpose of operating to supply fluid under pressure to hold the spring brake mechanism suppressed against operation to a brake application position when the control element is moved to application position and the dynamic brake mechanism is able to maintain the magnet of the device energized.

However, in some designs of the system, when the control element is moved to application position, fluid under pressure which normally maintains the spring brakes released may start to vent to the atmosphere before the lock-out magnet device can be energized sufficiently to cause its operation, which may result in causing the spring brake mechanism to effect an application of the brakes or to at least operate toward application position. This undesired spring brake application, during the time the lockout magnet valve device is inoperative, has little or no material effect upon the stopping of the train and is therefore unnecessary. Furthermore, such an application wastes fluid under pressure, causes undue wear of the spring brake parts and may also cause surges or shocks in the train, all of which is objectionable.

The principal object of the invention is to provide means which when embodied in a brake system of the above mentioned type will eliminate the undesired operation of the spring brake mechanism and thereby eliminate the above mentioned objectionable features.

This object is attained by the use of means for delaying the operation of the spring brake mechanism for an interval of time of such length as to permit the full energization of the lockout magnet device.

Since the spring brake mechanism is operated to its release position and maintained in this position by fluid under pressure, any failure of the control element, control pipe leading therefrom or the loss of main reservoir pressure for any reason whatever will result in stuck spring brakes which, under ordinary service conditions, could not be readily released. It is another object of the invention to provide means operative to readily effect the release of the spring brakes independently of the usual release means.

This object is attained by the use of a special reservoir normally charged with fluid under pressure and a valve operative to supply fluid under pressure from the reservoir to the brake cylinder, which valve, for illustrative purposes in the present embodiment of the invention has been shown as being manually controlled.

Other objects and advantages of the invention will be apparent from the following description taken in connection with the accompanying drawing, the single figure of which is a diagrammatic view, partly in section, of a portion of a brake system of the above mentioned type showing the invention embodied in the spring applied brake portion of the system.

The invention, as will hereinafter more fully appear, is embodied in the spring brake portion of a combined dynamic and spring brake system and, since the lock-out magnet device is the only part of the dynamic brake portion, aside from the usual control element, that exerts any control over the spring brake portion, the other parts of the dynamic brake portion are deemed unnecessary to a clear understanding of the invention and have not therefore been illustrated in the drawing. The following detailed description will therefore be more or less limited to what is illustrated.

In the drawing the reference character 2 indicates the lock-out magnet device having circuit wires 3 and 4 which may be connected into and may constitute parts of the dynamic brake system. It should here be mentioned that when the dynamic brake is cut into operation for braking, current flows through the wires 3 and 4 and magnet of the lock-out device so as to energize the magnet and thereby effect the operation of the device to its lock-out position. When the effectiveness of the dynamic brake reduces to a predetermined low value such that the magnet is practically deenergized, the device will operate from its lock-out position to its normal position as will hereinafter be more fully described.

As shown the brake equipment may comprise a fluid pressure storage source such as a main reservoir 1, a brake controlling valve device 5, a relay valve device 6, a brake cylinder 7, a release reservoir 8, a two position cut-out cock 9, two uni-directional flow check valve devices 10 and 11, a double check valve device 12 and a timing valve 13.

The main reservoir 1 is normally charged with fluid under pressure in the usual well known manner. Fluid under pressure flows from this reservoir to a main reservoir pipe 14.

The brake controlling valve device 5 is connected to the main reservoir pipe 14 by a branch supply pipe 15 and to a brake control pipe 16. The brake controlling valve device 5 is of the self-lapping type, the self-lapping portion of which is similar to the self-lapping portion of the brake valve device shown, described and claimed in Patent 2,084,675, of Clyde C. Farmer, issued June 22, 1937.

Briefly described, it comprises a self-lapping unit operative by means of a handle 17 to effect either an application or a release of the brakes. When the operating handle 17 is in release position, branch main reservoir pipe 15 is connected to the control pipe 16 so that this latter pipe is normally charged to main reservoir pressure.

When it is desired to effect an application of the brakes the handle 17 of the brake control valve device 5 is rotated to an application position in which the brake pipe is connected to the atmosphere. This results in a reduction of pressure in the control pipe 16. When it is desired to release the brakes the handle 17 is rotated toward release position resulting in an increase in pressure in the control pipe 16.

It should here be mentioned that the brake controlling device 5 besides having a self-lapping portion, also has switch means for controlling the dynamic brake portion of the system simultaneously with the spring brake portion. This combination of brake valve and brake switch may be of any preferred construction and since the combination is well known a showing thereof is deemed unnecessary.

The relay valve device 6 may be of any of the well known types commonly employed in fluid pressure brake systems and may be briefly described as comprising an operating piston for operating an exhaust valve and a supply valve. The face of the piston is subject to the pressure of fluid which may be supplied thereto through a pipe 18 and is subject on the other side to fluid at brake cylinder pressure, as will now be described. The supply valve chamber of the relay valve device is connected to the main reservoir pipe 14 through a branch pipe 19. The relay piston is operative to actuate the supply valve to deliver fluid under pressure to a brake cylinder supply pipe 20. The pressure established in the brake cylinder supply pipe 20 and consequently on said other side of the relay piston normally corresponds to the degree of control pressure acting on the face of the piston.

The lock-out magnet valve device 2 is of conventional type, comprising a suitable casing containing a pair of oppositely seating valves 21 and 22 of the poppet type and an electromagnet winding of the usual type (not shown) effective through a plunger 24 to operate the valves 21 and 22. As hereinbefore mentioned, the electromagnet winding is connected in the circuit with the dynamic braking portion of the system and is energized through the dynamic brake circuit when the dynamic brake is cut into service by operation of the brake controlling device 5.

Valve 21 is contained in a chamber 25 which is constantly open to the atmosphere through an exhaust port 26. This valve is adapted to seat on a valve seat formed on the wall in the casing which separates the valve chamber 25 from a chamber 23. The chamber 23 is connected to a pipe 27 leading to one end of the check valve device 12.

The valve 22 is contained in a chamber 28 which is constantly connected to the main reservoir pipe 14, past check valve 11, which permits flow of fluid from the pipe 14 to the chamber 28 and prevents flow of fluid in the opposite direction. A coil spring 29 disposed in this chamber and interposed between the valve 22 and the bottom wall of the casing, for urging the valve into sealing relation with a valve seat formed on the wall of the casing which separates the chamber 28 from the chamber 23.

The two valves 21 and 22 are connected by a fluted stem which extends through the walls in which the valve seats are formed. The stem being of such length that when the valve 22 is seated, as shown, the valve 21 is unseated and, conversely, when the valve 21 is seated, the valve 22 is unseated.

The electromagnet is so designed that so long as it is energized by a current in excess of a certain value, the downward force exerted by the plunger 24 on the valves 21 and 22 due to such energization is effective to overcome the force of the spring 29 and consequently cause the valves 21 and 22 to be seated and unseated, respectively. When the current energizing the magnet winding falls below such certain value, which normally occurs at a low speed, the spring 29 becomes effective to shift the valves 21 and 22 to seated and unseated positions, respectively.

With the valve 21 unseated and the valve 22 seated, as shown, the chamber 25 and consequently the pipe 27 leading to one end of the double check valve 12 is connected to atmosphere through the exhaust port 26. With the valve 21 seated and the valve 22 unseated, the exhaust communication just described is closed and fluid under pressure is supplied from the main reservoir pipe 14, past the valve 22 to the pipe 27.

The double check valve 12 is of conventional construction comprising a casing connected at one end to the pipe 27 leading from the lock-out magnet 2, as hereinbefore described. The check valve 12 at the opposite end of the casing is connected to a pipe 65 leading from the brake controlling device 5. At an intermediate point the casing is connected to the relay piston chamber pipe 18.

This check valve device 12 further comprises a shiftable check valve 30 which is operated in one direction in response to the pressure of fluid delivered through the control pipe 16 to a position for establishing communication between the pipe 16 and the pipe 18, as shown on the drawing. The valve 30 is operative in the opposite direction in response to the pressure of fluid delivered through the pipe 27 to establish communication between the pipe 27 and the pipe 18. The valve 30 will move to the left or to the right depending upon whether the pressure of fluid in pipes 16 and 27.

The spring brake cylinder 7 comprises a cylinder 31 having slidably mounted therein a piston 32 which is provided with a piston rod 33 slidably mounted in a suitable bore formed in an end cover 34 carried by the cylinder. The outer end 35 of the piston rod 33 is provided with an opening 36 adapted to receive a pin (not shown) for the attachment thereto of one end of the usual brake cylinder lever (not shown). A powerful coil spring 37 is interposed between the end cover 34 and the piston 32, which spring is adapted to exert sufficient force on the piston to effect operation of the piston 32 and piston rod 33 to apply the brakes. At the face side of piston 32 there is a chamber 38 which is normally charged with fluid at the pressure of that in the brake cylinder supply pipe 20.

The release reservoir 8 is normally charged with fluid under pressure from the brake cylinder supply pipe 20 by way of a connecting pipe 40 having interposed therein a check valve 10 which prevents back flow from the reservoir.

The cut-out cock 9 interposed in the brake cylinder supply pipe 20 between the relay valve 6 and the pressure chamber 38 of the brake cylinder 7 is of conventional design. The plug valve of the cock has a normal position in which the valve is adapted to establish communication between the relay valve 6 and the brake cylinder 7, as shown, and is operative to another position to cut off this communication and to establish communication from reservoir 8 to the brake cylinder chamber 38 by way of pipes 40 and 60, the plug valve and pipe 20.

The timing valve device 13 is interposed between the control pipe 16 and the pipe 65, at a point located between the brake controlling valve device 5 and the double check valve device 12 for the purpose of initially delaying operation of the relay valve device during an application of the brakes. This valve device 13 comprises a casing 41 containing a diaphragm 42 having at one side a chamber 43 open to the control pipe 16 through a restricted passage 44. This chamber is also open through a passage 45 to the pipe 65 leading to one side of the check valve device 12. At the opposite side of the diaphragm 42 there is provided a chamber 46 which is open to the atmosphere through a passage 47. Acting on diaphragm 42 and disposed in chamber 46 is a coil spring 48.

The diaphragm 42 is provided with a follower and a follower stem 49, which stem extends upwardly through an opening in a partition wall 50 of the casing and engages a ball check valve 51 contained in a chamber 52 which is constantly open to the control pipe 16 at the left hand side of the timing valve device. The valve 51 is adapted to seat on a valve seat formed in the wall 50 which separates the chamber 52 from the chamber 43. A coil spring 53, disposed in chamber 52 and interposed between the top of the valve 51 and the upper wall of chamber 52, tends to urge the valve to its seat.

The casing 41 is also provided with a chamber 55 constantly open to the pipe 65 leading from the right hand side of the timing valve device to the check valve device 12. The chamber 55 having formed at the bottom thereof a valve seat 56 upon which a ball check valve 57 is adapted to seat. The check valve 57 permits the flow of fluid from chamber 52 to the chamber 55 by way of a passage 58, but prevents flow in the opposite direction. The purpose of this check valve is to permit a quick recharge and release of the spring applied brakes.

*Operation*

With the brake controlling device 5 in release position an electric switch device associated therewith (not shown) causes the dynamic brake circuit to be maintained open, thus rendering the dynamic brake inoperative, and because of this there is no current flow through the circuit wires 3 and 4 so that the lock-out magnet 2 is deenergized.

Assuming that the main reservoir and the main reservoir pipe 14 are charged with fluid under pressure by operation of the usual compressor (not shown in the drawing), and that the various parts of the apparatus are in their brake release position as illustrated, the valve 22 in the lock-out magnet 2 cuts off communication between pipes 14 and 27 and valve 21 establishes communication between pipe 27 and the atmosphere, in a manner hereinbefore explained. At the same time the self-lapping unit of the brake controlling valve device 5 permits fluid to flow from the main reservoir pipe 14 to the face of the operating piston in the relay valve device 6, until the pressure of fluid supplied thereto is increased to the desired degree normally maintained therein, which in the present instance may be main reservoir pressure.

The flow of fluid from the main reservoir pipe 14 to the face of the operating piston in the relay valve device 6 is by way of pipe 15, past the normally unseated supply valve of the self-lapping unit of the brake controlling valve device 5 to the control pipe 16, through chamber 52, passage 58, past ball check valve 57 to the pipe 65 leading to the check valve device 12, past double check valve 30 and through pipe 18. Fluid under pressure thus supplied to chamber 52 also flows to the pipe 65 leading to the check valve device 12 and consequently to the face of the operating piston in the relay valve device 6 through two other communications, one of the two communications being through restricted passage 44, chamber 43 and passage 45. The other is past ball check valve 51, chamber 43 and passage 45, the flow through this passage continues until the pressure in chamber 43 has increased to a predetermined degree below the pressure normally carried in the main reservoir 1. When this occurs pressure of fluid acting in chamber 43 in opposition to the spring 48 at the opposite side of the diaphragm 42 causes the diaphragm to deflect downwardly and permit the diaphragm follower and stem 49 to move away from the valve 51. This allows the spring 53 to move the ball valve 51 into engagement with its associated seat, thus cutting off communication between chambers 52 and 43 through the unrestricted communication. At the same time fluid under pressure from the main reservoir pipe 14 flows to the supply valve of the relay valve device 6, by way of branch pipe 19.

Fluid under pressure supplied to the face of the operating piston in the relay valve device 6, as just described, causes the relay valve device to function in the usual well known manner, to supply fluid under pressure from pipe 19 to pipe 20 from whence it flows through cut-out cock 9 to the pressure chamber 38 of the spring brake cylinder device 7.

Fluid supplied to the pressure chamber 38 of the spring brake cylinder, in the manner just explained, forces the piston 32 and piston rod 33 outwardly against the opposing pressures of spring 37, and into release position, as shown in the drawing. Fluid under pressure supplied to pipe 20 also flows through pipe 40, past check valve 10 to charge the reservoir 8.

When it is desired to effect an application of the brakes the handle of the brake controlling valve device is moved to any position within an application zone and the control switch device hereinbefore mentioned is moved to a corresponding dynamic brake application position, in which the usual and well known circuits are set up for effecting dynamic braking and for supplying current to the circuit wires 3 and 4 for energizing the lock-out magnet valve device 2. Although the electromagnet of the lock-out magnet valve device 2 is responsive to low values of current supplied thereto, a certain interval of time is required for the dynamic brake to become effective and thus energize the windings of the electromagnet.

At the same time as the dynamic brake application is initiated the self-lapping mechanism of the brake controlling valve device 5 operates to vent fluid under pressure from the pipe 16 and thereby decrease the pressure of fluid acting on the face of the operating piston in the relay valve device 6. The reduction of pressure from the face of the operating piston, however, can only occur at a restricted rate by way of pipe 18, past check valve 12, pipe 65 leading from the check valve device 12, passage 45, chamber 43, restricted passage 44 and control pipe 16. Since the check valve 57 definitely cuts off flow of fluid through passage 58 in the direction of chamber 52 and the check valve 51 is seated, as hereinbefore explained and cuts off communication between chambers 43 and 52, the reduction of pressure from the face of the operating piston in the relay valve device 6 will be at a slow rate, as governed by the restriction in the passage 44, until the pressure in chamber 43 is reduced to a predetermined value below main reservoir pressure. When the pressure of fluid in chamber 43 is reduced to this predetermined pressure, the spring 48, at the opposite side of the diaphragm, moves the diaphragm 42 and the diaphragm follower and stem 49 upwardly against the opposing force of spring 53 and unseats the check valve 53, thus causing a reduction of fluid pressure acting on the face of the operating piston in the relay valve device at a relatively unrestricted rate. When this occurs the relay valve device operates in the usual manner to cause a reduction of fluid pressure in chamber 38 of the spring applied brake cylinder device 7.

As the fluid pressure in the pressure chamber 38 is thus reduced, the powerful spring 39 becomes effective to shift the piston 32 and piston rod 33 to the right, as viewed in the drawing, to effect an application of the brakes. The spring brake cylinder device 7 is then effective to hold the brakes applied until sufficient fluid pressure is restored in the chamber 38 to move the brake cylinder piston to release position against the opposing pressure of the spring 37.

The purpose of initially reducing the pressure of fluid acting on the face of the operating piston in the relay valve device 6 at a slow rate is to hold back or delay the operation of the brake cylinder 7 to application position for a period of time long enough to permit the dynamic brake system to become effective to energize the windings of the lock-out magnet valve device 2.

Upon the required energization of the windings of the magnet the valve 21 will be caused to seat and the valve 22 will be unseated. With the valves 21 and 22 in these positions the communication from pipe 27 to the atmosphere is cut off and fluid under pressure is supplied from the main reservoir pipe 14 past valve 22 to the pipe 27.

Now since the pressure in pipe 65 interposed between the timing valve device 13 and check valve device 12 and consequently in the chamber at the left hand face of the check valve 30 is reduced below the pressure of the fluid at main reservoir pressure in pipe 27, acting on the right hand face of the check valve 30, the higher pressure in pipe 27 causes the check valve 30 to move to its left hand seating position.

When this occurs, fluid at main reservoir pressure flows from pipe 27, past the unseated end of the check valve 30 and through pipe 18 to the chamber at the face side of the piston of the relay valve device 6 which piston functions under the influence of the pressure of fluid supplied thereto to supply fluid under pressure from the main reservoir to the piston chamber 38 of the brake cylinder device 7 to maintain the spring applied brakes released.

It will be understood that as long as the effectiveness of the dynamic brake is sufficient to energize the electromagnet of the lock-out magnet valve device to maintain the valve 21 seated and the valve 22 unseated, the spring applied brake portion of the system will be maintained in release position and all braking will be accomplished by the dynamic brake portion of the system. However, as the speed of the vehicle diminishes, the effectiveness of the dynamic brake system will at some low speed begin to diminish and as a consequence the magnetic pull of the electromagnet of the lock-out magnet device will be reduced to such an extent that it can no longer overcome the opposing pressure of the spring 29 and as a result the valves 21 and 22 will then be actuated upwardly by the spring 29 into the position shown on the drawing whereupon the spring applied brake will become effective to initiate an application of the wheel brakes to bring the vehicle to a stop, as previously described.

When it is desired to effect a release of the brakes the brake controlling valve device 5 is moved to release position, in which position, the dynamic brake system is cut out and the self-lapping unit operates to again supply fluid under pressure to the control pipe 16 whereupon the other parts of the equipment return to the position shown in the drawing. Both brakes will therefore be released and the vehicle is again free to be propelled.

If for any reason either the brake controlling valve device 5 or the relay valve device 6 are rendered inoperative to supply fluid under pressure to the pressure chamber 38 of the brake cylinder 7, a stuck brake would result, which without a novel release feature embodied in the present invention, would under normal circumstances be difficult to release.

In the event that an occurrence of the type just referred to should take place, the offending spring applied brake may according to the invention be released and maintained released. To accomplish this the handle of the cut-out cock 9 is moved to the position indicated in dotted lines. In this position communication between the relay valve device and the pressure chamber 38 of the brake cylinder 7 is cut off and communication is established between reservoir 8 and the pressure chamber 38. Fluid under pressure at main reservoir pressure then flows from the normally charged reservoir 8 to the pressure chamber 38 by way of pipe 40, a branch pipe 60 through cutout cock 9 and pipe 20, thus effecting a release of the brakes.

While one illustrative embodiment of the invention has been described in detail, it is not my intention to limit its scope to that embodiment or otherwise than by the terms of the appended claims.

Having now described my invention, what I claim as new and desire to secure by Letters Patent is:

1. In a brake system of the type having a spring operated brake apparatus which is maintained in release position by fluid under pressure and which is operative upon a reduction in the pressure of fluid therein for effecting an application of the brakes and also having a brake controlling device operative to a brake release position for effecting the supply of fluid pressure to the apparatus and operative to a brake applying position for effecting the reduction in the pressure of fluid in the apparatus, in combination, means for admitting fluid under pressure to the apparatus at a rapid rate, and means for controlling the flow of fluid from the apparatus to first provide for a slow reduction in the pressure of fluid in the apparatus until the pressure has been reduced to a predetermined degree and to then provide for a rapid reduction in the pressure.

2. In a brake mechanism in combination, a spring-energized brake, operating means normally maintained in a release position and operable to a brake application position, a control pipe normally charged with fluid at a predetermined pressure, said means being operable upon a certain reduction in the pressure of fluid in the control pipe to effect operation of the operating means to the brake application position, a brake valve device for effecting the supply of fluid at said predetermined pressure to and for effecting a reduction in the pressure of fluid in said pipe, means automatically operative upon the reduction in the pressure of fluid in said pipe for controlling the reduction therefrom first at a slow rate and then at a faster rate.

3. In a brake system for a vehicle in combination, a brake cylinder having a chamber normally charged with fluid at a certain pressure for maintaining the brakes released and operative upon a reduction of fluid pressure in said chamber below said certain pressure for effecting an application of the brakes, a valve device having a release position for supplying fluid under pressure to said chamber and having an application position for releasing fluid under pressure from said chamber, a brake controlling valve mechanism for effecting operation of said valve device, and means interposed between said brake controlling valve mechanism and said valve device operative when said brake controlling valve mechanism is operated to effect operation of said valve device to release the pressure of fluid from said chamber for initially delaying for an interval of time operation of said valve device.

4. In a brake system of the type having a spring operated brake equipment which is maintained in release position by fluid under pressure and which is operative upon a reduction in the pressure of fluid in the equipment for effecting an application of the brakes, a brake controlling device operative to control the supply of fluid under pressure to and the release of fluid under pressure from the equipment and means interlocked with a different brake equipment controlled by said brake controlling device and operative when the brake controlling valve device is in position to release fluid under pressure from the spring brake equipment to supply fluid under pressure to maintain the spring brake equipment in release position and operative to cut off the supply upon a decrease in the effectiveness of said other brake equipment, in combination, means for holding back the operation of the spring brake equipment to effect an application of the brakes for an interval of time of sufficient length to permit the operation of the interlocking means to supply fluid, and means responsive to a predetermined reduction in the pressure of fluid in the spring brake equipment for effecting the operation of the spring brake equipment to apply the brakes.

5. The combination with a spring applied fluid pressure released brake apparatus and a circuit associated with a dynamic brake apparatus, the voltage in which is varied according to the effectiveness of the dynamic brake, said dynamic brake being normally slower acting than said spring applied brake, of means responsive to voltage in said circuit above a predetermined degree for maintaining said spring applied brake released, a brake controlling valve device for effecting a variation of fluid pressure to initiate the application of the spring applied brake, and means operative upon a substantially simultaneous initiation of an application of the dynamic brake and the spring applied brake for delaying the application of said spring applied brake for an interval of time sufficient for said voltage responsive means to become effective.

6. In a brake mechanism in combination, a brake cylinder having a chamber normally charged with fluid at a certain pressure for effecting a release of the brakes and operative upon a reduction of fluid pressure in said chamber below said certain pressure for effecting an application of the brakes, a brake controlling valve device operative in release position to supply fluid under pressure to said chamber and operative in application position to release fluid under pressure from said chamber, electrically controlled means for also effecting a supply of fluid under pressure to said chamber, said electrically controlled means being slowly rendered operative when said brake controlling valve device is in an application position to initiate a supply of fluid under pressure to said chamber, and other means interposed between said brake cylinder chamber and said brake controlling valve device for delaying the release of fluid from said chamber for a period of time of such length as to permit said electrically controlled means to become effective to supply fluid under pressure to the chamber.

7. The combination with a combined electrical and mechanical brake system of the type comprising a spring applied fluid pressure released brake and electrically controlled means disposed in a circuit associated with a dynamic brake and operative when the effectiveness of the dynamic brake is above a predetermined value to maintain the spring applied brake released, of means operative upon initiating an application of the brakes for initially delaying application operation of the spring applied brake, said means comprising a fluid pressure operated valve device controlled by the pressure of fluid supplied to effect release of said spring applied fluid pressure released brake.

8. In a brake system of the type having spring applied fluid pressure released brake operating means and dynamic brake operating means, in combination, a normally closed communication through which fluid under pressure is adapted to be supplied when open to effect a release of said fluid pressure released brakes, said communication being controlled by electroresponsive means disposed in a circuit associated with said dynamic brake means and operative after an interval of time to open said communication upon initiating an application of the brakes, to prevent the spring applied brake means effecting an application of the brakes, a second communication through which fluid under pressure is adapted to be supplied or released to effect either an application or a release of the spring applied brakes, and means interposed in said second communication for delaying for an interval of time sufficient for said electroresponsive means to open said first communication, the release of fluid through said second communication.

9. In a brake system having a spring operated brake equipment which is maintained in release position by fluid under pressure and which is operative upon a reduction in the pressure of fluid in the equipment for effecting an application of the brakes and also having a brake controlling device movable to a brake release position for effecting the supply of fluid under pressure to the equipment and movable to a brake applying position for effecting a reduction in the pressure of fluid in the equipment, in combination, a reservoir normally charged with fluid under pressure from the equipment, a check valve preventing back flow of fluid from said reservoir to the equipment, and a valve device operative to supply fluid under pressure from said reservoir to the equipment to effect a release of the brakes.

10. In a brake system for a vehicle, in combination, a brake cylinder having a chamber normally charged with fluid at a certain pressure for effecting a release of the brakes and operative upon a reduction of fluid pressure in said chamber below said certain pressure for effecting an application of the brakes, primary valve means located at the usual control station for controlling the supply of fluid to and the release of fluid from said chamber, auxiliary means located at a point remote from said valve means for effecting a release of the brakes, said auxiliary means comprising a reservoir normally charged with fluid under pressure at said certain pressure, and a manually operative valve device for supplying fluid under pressure from said reservoir to said chamber.

11. In a brake system for a vehicle, in combination, a brake cylinder having a chamber normally charged with fluid at a certain pressure for effecting a release of the brakes and operative upon a reduction of fluid pressure in said chamber below said certain pressure for effecting an application of the brakes, a main reservoir normally charged with fluid under pressure, primary control valve means located at the usual control station having a release position for controlling the supply of fluid under pressure from the main reservoir to said chamber for effecting a release of the brakes and having an application position for controlling the release of fluid under pressure from said chamber to effect an application of the brakes, an auxiliary reservoir adapted to be charged with fluid under pressure from said main reservoir when effecting a release of the brakes, means for preventing back flow of fluid under pressure from said auxiliary reservoir when effecting an application of the brakes, and an auxiliary control valve device located at a point remote from said control station for effecting a release of the brakes, said auxiliary control valve device being operative in effecting a release of the brakes to supply fluid under pressure from said auxiliary reservoir to said chamber.

12. In a brake system, a braking member, yielding constant pressure means for rendering said braking means operative, fluid pressure actuated means for rendering said braking means inoperative, manually controlled means for supplying fluid under pressure to said fluid actuated means and fluid pressure means auxiliary to said system for operating said fluid pressure actuated means to hold said braking means inoperative under emergency conditions.

13. In a brake, a braking member, yielding constant pressure means for rendering said braking means operative, fluid pressure actuated means for rendering said braking means inoperative, a fluid line connected to said fluid pressure actuated means, valve controlled means for admitting fluid under pressure to said fluid line, an auxiliary fluid storage chamber, means including a non-return valve connecting said reservoir to said fluid line, and means including a manually operable valve connecting said reservoir with said fluid pressure actuated means.

14. In a brake system of the type having a spring operated brake equipment which is maintained in release position by fluid under pressure and which is operative upon a reduction in the pressure of fluid in the equipment for effecting an application of the brakes, a primary brake controlling device operative to control the supply of fluid under pressure to and the release of fluid under pressure from the equipment and means interlocked with a different brake equipment controlled by said brake controlling device and operative when the brake controlling valve device is in position to release fluid under pressure from the spring brake equipment to supply fluid under pressure to maintain the spring brake equipment in release position and operative to cut off the supply upon a decrease in the effectiveness of said other brake equipment, in combination, other means for effecting a release of the brakes, said other means comprising a source of fluid under pressure, and a second control valve device having a normal position for rendering the primary brake controlling device effective and another position for rendering the primary brake controlling device ineffective, and for, at the same time, operative to supply fluid under pressure from said source to the equipment to effect a release of the brakes.

15. The combination with a spring brake of the type comprising a brake cylinder having a chamber normally charged with fluid under pressure for maintaining the brakes released and operative upon a reduction of fluid pressure in said chamber for effecting an application of the brakes, a brake controlling valve device operative in release position to supply fluid under pressure to said chamber and operative in application position to release fluid under pressure from said chamber and electrically controlled means disposed in a circuit associated with a dynamic brake and operative when the effectiveness of the dynamic brake is above a predetermined value to supply fluid under pressure to said chamber to maintain the spring brakes released and operative to cut off the supply upon a decrease in the effectiveness of the dynamic brake, said electrically controlled means being operative upon substantially simultaneous initiation of an application of the dynamic brake and the spring applied brake, means independent of the brake controlling valve device and said electrically controlled means for effecting a release of the spring applied brakes, said means comprising a source of fluid under pressure, and valve means including a normally closed valve operative to admit fluid under pressure from said source to said chamber.

ARTHUR G. LARSON.